United States Patent [19]

Minami et al.

[11] Patent Number: 4,874,808

[45] Date of Patent: Oct. 17, 1989

[54] CYCLOOLEFIN TYPE RANDOM COPOLYMER COMPOSITIONS AND USES THEREOF

[76] Inventors: Syuji Minami, 2-2 Misono 1-chome, Ooctake-shi, Hiroshima; Keiji Kawamoto, 30-6 Ajina 4-chome, Hatsukaichi-shi, Hiroshima; Tetsuji Kasai, 4-3 Wakicho, Waki 2-chome; Toshiaki Kuroiwa, 4-2 Wakicho, Waki 2-chome, both of Kuga-gun, Yamaguchi; Akira Todo, 5 Yushudainishi 2-chome, Ichihara-shi, Chiba, all of Japan

[21] Appl. No.: 188,490

[22] Filed: Apr. 29, 1988

[30] Foreign Application Priority Data

May 1, 1987 [JP] Japan ................... 62-106354
May 8, 1987 [JP] Japan ................... 62-110630

[51] Int. Cl.⁴ .................. C08K 5/13; C08K 5/10; C08L 23/08; C08L 45/00
[52] U.S. Cl. ................... 524/291; 524/518; 524/553; 525/210; 526/281
[58] Field of Search ............ 525/210; 524/291, 553; 526/281

[56] References Cited

U.S. PATENT DOCUMENTS 4,614,778 9/1986 Kajiura et al. .............. 526/281
4,720,715 1/1988 Omae et al. ................ 526/281

FOREIGN PATENT DOCUMENTS 203799 12/1986 European Pat. Off. .
61-211315 9/1986 Japan .
61-292601 12/1986 Japan .
62-215611 9/1987 Japan .

*Primary Examiner*—Carman J. Seccuro
*Attorney, Agent, or Firm*—Sherman and Shalloway

[57] ABSTRACT

Compositions comprising (A) cycloolefin random copolymer containing an ethylene component, and a cycloolefin component represented by the general formula [I] or [II] and having an intrinsic viscosity of 0.05–10 dl/g as measured at 135° C. in decalin and a softening temperature (TMA) not lower than 70° C., and (B) a cycloolefin random copolymer containing an ethylene component, and a cycloolefin component represented by the general formula [I] or [II] and having an intrinsic viscosity of 0.01–5 dl/g as measured at 135° C. in decalin and a softening temperature (TMA) of below 70° C., the weight ratio of said (A) component/(B) component ranging from 100/0.1 to 100/10.

The composition is particularly useful for molding an information recording base board.

8 Claims, No Drawings

CYCLOOLEFIN TYPE RANDOM COPOLYMER COMPOSITIONS AND USES THEREOF

FIELD OF THE INVENTION

This invention relates to cycloolefin type random copolymer compositions which exhibit outstanding performances such as transparency, heat resistance, moisture resistance and chemical resistance, and which are excellent in high precision moldability as well as in adhesion of information recording films. This invention also relates to use of the cycloolefin type random copolymer compositions.

BACKGROUND OF THE INVENTION

Known as synthetic resins excellent in transparency are polycarbonates, polymethyl methacrylate, polyethylene terephthalate, etc. For instance, polycarbonates are resins which are excellent in transparency as well as in heat resistance, heat ageing characteristics and impact strength. However, polycarbonates involve such a problem that they are poor in chemical resistance as they are easily attacked by strong alkali. Polymethyl methacrylate has such problems that it is readily attacked by ethyl acetate, acetone, toluene or the like, swells in ether and, moreover, it is low in heat resistance. Though polyethylene terephthalate is excellent in heat resistance and mechanical properties, it involves such problems that it is weak in resistance to strong acid or alkali and is subject to hydrolysis.

On one hand, polyolefins which are widely used as general-purpose resins are excellent in chemical resistance and solvent resistance as well as in mechanical properties. However, many of polyolefins are poor in heat resistance and are poor in transparency because they are crystalline resins. In general, to improve polyolefins in transparency, there is employed a procedure in which nucleating agents are incorporated into polyolefins to render their crystal structure microcrystalline, or a procedure in which polyolefins are quenched to stop the crystal growth thereof. However, it is hard to say that the alleged effects obtained by these procedures are sufficient. The procedure of incorporating into polyolefins a third component such as nucleating agents rather involves the risk of marring various excellent properties inherent in polyolefins, and the quenching procedure requires a large-scale apparatus therefor and, in addition thereto, involves the risk of lowering heat resistance and rigidity as the crystallinity index of polyolefins decreases. That is, in either case, it is not possible to perfectly control the crystal growth of polyolefins, and there remain such problems that the molding shrinkage factor of the thus treated polyolefins is high, and further that the post-shrinkage of molded articles obtained after molding said polyolefins is also high.

Under such circumstances, a copolymer of ethylene and 2,3-dihydroxydicyclopentadiene has been disclosed as an example of copolymers of ethylene and bulky comonomers, for example, in U.S. Pat. No. 2,883,372. However, this copolymer is poor in heat resistance as it has a glass transition temperature in the vicinity of 100° C., though said polymer is well balanced between rigidity and transparency. Similar drawback is also observed in copolymers of ethyllene and 5-ethylidene-2-norbornene.

Japanese Patent Publn. No. 14910/1970 proposes a homopolymer of 1,4,5,8-dimethano-1,2,3,4,4a,5,8,8a-octahydronaphthalene. The proposed polymer, however, is poor in heat resistance and heat ageing characteristics. Japanese Patent L-O-P Publn. No. 127728/1983 further proposes a homopolymer of 1,4,5,8-dimethano-1,2,3,4,4a,5,8,8a-octahydronaphthalene or copolymers of said cycloolefin and norbornene type comonomers, which are apparently those obtained by ring opening polymerization (ring opening polymers) in light of the disclosure in said publication. These ring opening polymers which have unsaturated bonds in the polymer main chain, however, have such a drawback that they are poor in heat resistance and heat ageing characteristics.

In the course of these researches, we found that cycloolefin type random copolymers of ethylene and specific bulky cycloolefins are synthetic resins which are well balanced between heat resistance, heat ageing characteristics, chemical resistance, solvent resistance, dielectric characteristics and mechanical properties, and that said cycloolefin type random copolymers exhibit excellent performances in the field of optical materials such as optical memory disc and optical fiber. On the basis of the above findings, we have already made various technical proposals as disclosed in Japanese Patent L-O-P Publn. No. 168708/1984, Japanese Patent Appln. Nos. 220550/1974, 236828/1984, 236829/1984 and 242336/1984. In spite of their being olefin type polymers, the cycloolefin type random copolymers as proposed are excellent in adhesion to various materials. However, when these cycloolefin type random copolymers were used for molding information recording base boards under severe conditions, they were sometimes found insufficient in adhesion to information recording films.

As regards information recording base boards (hereinafter sometimes abbgreviated to "optical discs"), polymethyl methacrylates, polycarbonates, polystyrenes, rigid polyvinyl chlorides, epoxy resins, etc., have heretofore been used as resin materials to constitute optical discs. However, optical discs molded from these resin materials individually have a fairly large number of drawbacks. For instance, polymethyl methacrylates are poor in heat resistance and high in water absorption as high as 0.4%. Therefore, molded articles obtained from polymethyl methacrylates are subject to dimensional change owing to their moisture absorption and liable to warp. Polycarbonates are high in modulas photoelasticity as well as in double refraction, even though they are excellent in heat resistance. Moreover, polycarbonates are low in surface hardness and liable to marring, and the problem of moisture resistance still remains unsolved, though the water absorption of polycarbonates is as low as 0.15% in comparison with polymethyl methacrylates. Polycarbonates are practically unusable as optical discs, because they are poor in heat resistance, impact resistance and surface hardness, not to speak of their high double refraction after molding. Polyvinyl chlorides are difficult to use as optical discs, because they are very poor in heat resistance and, moreover, poor in processability and service durability. Epoxy resins involve difficulty in point of mass production as they are poor in moldability, though they are excellent in heat resistance. Moreover, epoxy resins are high in modulus of photoelasticity and involve the problem of double refraction due to residual stress produced at the time when they are molded. Glass is fragile and easily broken and, moreover, it is poor in easy handling or productivity as it is relatively heavy in weight, though it is excellent in heat resistance, moisture resistance and surface hardness.

OBJECT OF THE INVENTION

The present invention is intended to solve such problems associated with the prior art as mentioned above, and an object of the invention is to provide resin compositions which are excellent in transparency, heat resistance, heat ageing characteristics, chemical resistance, solvent resistance, dielectric characteristics and various mechanical characteristics as well as in precision moldability and, moreover, which are excellent in adhesion of information recording films, and information recording base boards which are molded from said resin compositions.

SUMMARY OF THE INVENTION

In accordance with the present invention, there are provided cycloolefin type random copolymer compositions characterized by comprising (A) a cycloolefin type random copolymer containing an ethylene component, and a cycloolefin component represented by the following general formula [I] or [II] and having an intrinsic viscosity [η] of 0.05-10 dl/g as measured at 135° C. in decalin and a softening temperature (TMA) of not lower than 70° C., and (B) a cycloolefin type random copolymer containing an ethylene component, and a cycloolefin component represented by the following general formula [I] or [II] and having an intrinsic viscosity [η] of 0.01-5 dl/g as measured at 135° C. in decalin and a softening temperature (TMA) of below 70° C., the weight ratio of said (A) component/(B) component ranging from 100/0.1 to 100/10, and there are also provided information recording base boards which have been molded from said cycloolefin type random copolymer compositions.

General formula

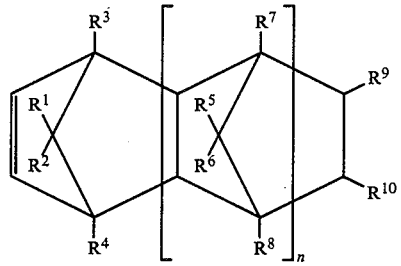

[I]

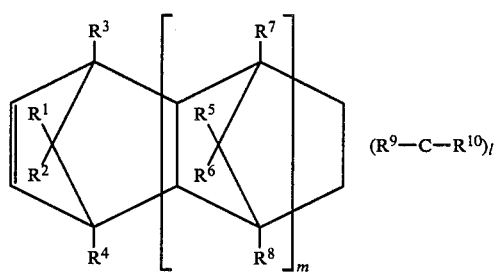

[II]

wherein n and m are each 0 or a positive integer, l is an integer of at least 3, and $R^1$ to $R^{10}$ each represent hydrogen atom, halogen atom or hydrocarbon group.

DETAILED DESCRIPTION OF THE INVENTION

The cycloolefin type random copolymer compositions of the present invention and information recording base boards which are molded from said compositions are illustrated below in detail.

The cycloolefin type random copolymers [A] and [B] which constitute the compositions of the present invention are cycloolefin type random copolymers containing an ethylene component and a specific cycloolefin component. The said cycloolefin component is a cycloolefin component represented by the following general formula [I] or [II], and in the cycloolefin type random copolymers, said cycloolefin component forms a structure represented by the general formula [III] or [IV].

General formula

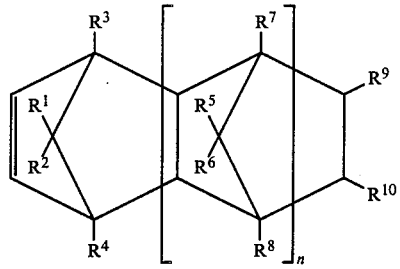

[I]

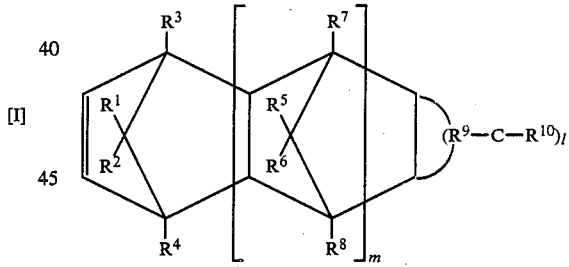

[II]

wherein n and m each are 0 or a positive integer, preferably 0 or 1, l is an integer of at least 3, and $R^1$ to $R^{10}$ each represent hydrogen atom, halogen atom or hydrocarbon group.

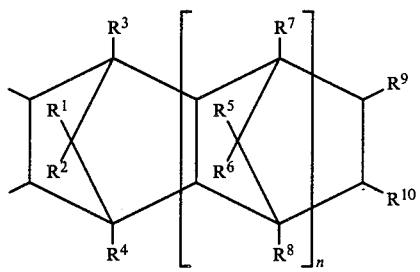

[III]

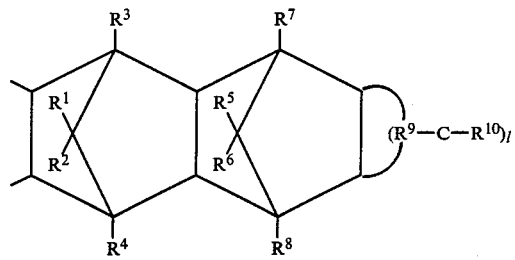

[IV]

wherein n, m, l and $R^1$ and $R^{10}$ are as defined above.

The cycloolefin, i.e. a constituent component of the cycloolefin type random copolymers constituting the compositions of the present invention, is at least one cycloolefin selected from the group consisting of unsaturated monomers represented by the general formulas [I] and [II]. The cycloolefins represented by the general formula [I] can easily be prepared by condensation of cyclopentadienes with appropriate olefins by Diels-Alder reaction, and similarly the cycloolefins represented by the general formula [II] can easily be prepared by condensation of cyclopentadienes with appropriate cycloolefins by Diels-Alder reaction.

The cycloolefins represented by the general formula [I] in the concrete are such compounds as exemplified in Table 1 or, in addition to 1,4,5,8-dimethano-1,2,3,4,4a,5,8,8a-octahydronaphthalene, such octahydronaphthalenes as 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,,8a-octahydronaphthalene, 2-chloro-1,4,5,8-dimethano-1,2,3,4,4a,5,8,8a-octahydronaphthalene, 2-bromo-1,4,5,8-dimethano-1,2,3,4,4a,5,8,8a-octahydronaphthalene, 2-fluoro-1,4 5,8-dimethano-1,2,3,4,4a,8,8a-octahydronaphthalene, 2,3-dichloro-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2-n-butyl-1,4,5,8-dimenthano-1,2,3,4,4a,5,8,8a-octahydronaphthalene, 2-isobutyl-1,4,5,8-dimethano-b 1,2,3,4,4a,5,8,8a-octahydronaphthalene, etc. and such compounds as exemplified in Table 2.

TABLE 1

| Chemical formula | Compound name |
| --- | --- |
| 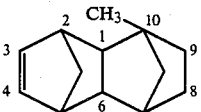 | Bicyclo[2,2,1]hept-2-ene |
| 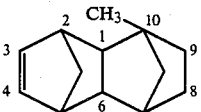 | 6-Methylbicyclo[2,2,1]hept-2-ene |
| 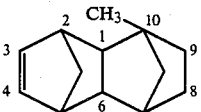 | 5,6-Dimethylbicyclo[2,2,1]hept-2-ene |
| 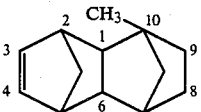 | 1-Methylbicyclo[2,2,1]hept-2-ene |
| 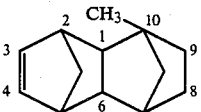 | 6-Ethylbicyclo[2,2,1]hept-2-ene |
| 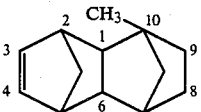 | 6-n-Butylbicyclo[2,2,1]hept-2-ene |
| 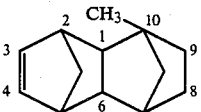 | 6-Isobutylbicyclo[2,2,1]hept-2-ene |
| 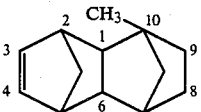 | 7-Methylbicyclo[2,2,1]hept-2-ene |

TABLE 2

| Chemical formula | Compound name |
| --- | --- |
| 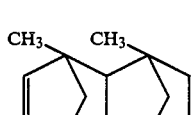 | 5,10-Dimethyltetracyclo-[4,4,0,1$^{2.5}$,1$^{7.10}$]-3-dodecene |
| 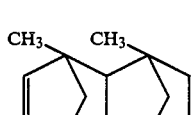 | 2,10-Dimethyltetracyclo-[4,4,0,1$^{2.5}$,1$^{7.10}$]-3-dodecene |
| 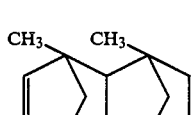 | 11,12-Dimethyltetracyclo-[4,4,0,1$^{2.5}$,1$^{7.10}$]-3-dodecene |

TABLE 2-continued

| Chemical formula | Compound name |
|---|---|
| | 2,7,9-Trimethyltetracyclo-[4,4,0,1$^{2.5}$,1$^{7.10}$]-3-dodecene |
| | 9-Ethyl-2,7-dimethyltetracyclo-[4,4,0,1$^{2.5}$,1$^{7.10}$]-3-dodecene |
| | 9-Isobutyl-2,7-dimethyltetracyclo-[4,4,0,1$^{2.5}$,1$^{7.10}$]-3-dodecene |
| | 9,11,12-trimethyltetracyclo-[4,4,0,1$^{2.5}$,1$^{7.10}$]-3-dodecene |
| | 9-Ethyl-11,12-dimethyltetracyclo-[4,4,0,1$^{2.5}$,1$^{7.10}$]-3-dodecene |
| | 9-Isobutyl-11,12-dimethyltetracyclo[4,4,0,1$^{2.5}$,1$^{7.10}$]-3-dodecene |
| | 5,8,9,10-Itramethyltetracyclo-[4,4,0,1$^{2.5}$,1$^{7.10}$]-3-dodecene |
| | Hexacyclo[6,6,1,1$^{3.6}$,1$^{10.13}$,0$^{2.7}$,0$^{9.14}$]-4-heptadecene |
| | 12-Methylhexacyclo[6,6,1,1$^{3.6}$,1$^{10.13}$,0$^{2.7}$,0$^{9.14}$]-4-heptadecene |
| | 12-Ethylhexacyclo[6,6,1,1$^{3.6}$,1$^{10.13}$,0$^{2.7}$,0$^{9.14}$]-4-heptadecene |
| | 12-Isobutylhexacyclo[6,6,1,1$^{3.6}$,1$^{10.13}$,0$^{2.7}$,0$^{9.14}$]-4-heptadecene |
| | 1,6,10-Trimethyl-12-isobutyl-hexacyclo[6,6,1,1$^{3.6}$,1$^{10.13}$,0$^{2.7}$,0$^{9.14}$]-4-heptadecene |

TABLE 2-continued

| Chemical formula | Compound name |
|---|---|
| | Octacyclo[8,8,0,1$^{2.9}$,1$^{4.7}$,1$^{11.18}$, 1$^{13.16}$,0$^{3.8}$,0$^{12.17}$]-5-docosene |
| | 15-Methyloctacyclo[8,8,0,1$^{2.9}$, 1$^{4.7}$,1$^{11.18}$,1$^{13.16}$,0$^{3.8}$,0$^{12.17}$]-5-docosene |
| | 15-Ethyloctacyclo[8,8,0,1$^{2.9}$,1$^{4.7}$, 1$^{11.18}$,1$^{13.16}$,0$^{3.8}$,0$^{12.17}$]-5-docosene |

The cycloolefins represented by the general formula [II] in the concrete are, for example, those as exemplified in Tables 3 and 4.

TABLE 3

| Chemical formula | Compound name |
|---|---|
| | 1,3-Dimethylpentacyclo[6,6,1, 1$^{3.6}$,0$^{2.7}$,0$^{9.14}$]-4-hexadecene |
| | 1,6-Dimethylpentacyclo[6,6,1,1$^{3.6}$, 0$^{2.7}$,0$^{9.14}$]-4-hexadecene |
| | 15,16-Dimethylpentacyclo[6,6,1, 1$^{3.6}$,0$^{2.7}$,0$^{9.14}$]-4-hexadecene |
| | Pentacyclo[6,5,1,1$^{3.6}$,0$^{2.7}$,0$^{9.13}$]-4-pentadecene |
| | 1,3-Dimethylpentacyclo[6,5,1,1$^{3.6}$, 0$^{2.7}$,0$^{9.13}$]-4-pentadecene |
| | 1,6-Dimethylpentacyclo[6,5,1, 1$^{3.6}$,0$^{2.7}$,0$^{9.13}$]-4-pentadecene |
| | 14,15-Dimethylpentacyclo[6,5,1, 1$^{3.6}$,0$^{2.7}$,0$^{9.13}$]-4-pentadecene |

TABLE 3-continued

| Chemical formula | Compound name |
| --- | --- |
| (structure) | Pentacyclo[6,6,1,1$^{3.6}$,0$^{2.7}$,0$^{9.14}$]-4-hexadecene |
| (structure) | Heptacyclo[8,7,0,1$^{2.9}$,1$^{4.7}$,1$^{11.17}$, 0$^{3.8}$,0$^{12.16}$]-5-eicosene |
| (structure) | Heptacyclo[8,8,0,1$^{2.9}$,1$^{4.7}$,1$^{11.18}$, 0$^{3.8}$,0$^{12.17}$]-5-heneicosene |

TABLE 4

| Chemical formula | Compound name |
| --- | --- |
| (structure) | Tricyclo[4,3,0,1$^{2.5}$]-3-decene |
| (structure) | 2-Methyl-tricyclo[4,3,0,1$^{2.5}$]-3-decene |
| (structure) | 5-Methyl-tricyclo[4,3,0,1$^{2.5}$]-3-decene |
| (structure) | Tricyclo[4,4,0,1$^{2.5}$]-3-undecene |
| (structure) | 10-Methyl-tricyclo[4,4,0,1$^{2.5}$]-3-undecene |

The cycloolefin type random copolymers [A] and [B] which constitute the compositions of the present invention individually contain as essential components an ethylene component and the aforementioned cycloolefin component. In addition to the said essential two components, however, the cycloolefin type random copolymers [A] and [B] may contain, if necessary, other copolymerizable unsaturated monomer components such a range that they do not hinder the object of the present invention. Such unsaturated monomers which may optionally be copolymerized in the concrete are α-olefins of 3 to 20 carbon atoms, such as propylene, 1-butene, 4-methyl-1-pentene, 1-hexene, 1-octene, 1-decene, 1-dodecene, 1-tetradecene, 1-hexadecene, 1-octadecene, 1-eicosane, etc. in the range of less than an equimolar amount of the ethylene component unit in the resulting random copolymer.

In the cycloolefin type random copolymer [A] which constitute the compositions of the present invention, the repeating unit (a) derived from the ethylene component is in the range of from 40 to 85 mol %, preferably from 50 to 75 mol %, the repeating unit (b) derived from the cycloolefin component is in the range from 15 to 60 mol %, preferably from 25 to 50 mol %, and the repeating unit (a) derived from the ethylene component and the repeating unit (b) derived from the cycloolefin component form a substantially linear cycloolefin type random copolymer in which said repeating unit (a) and said repeating unit (b) are random orientated. That the cycloolefin type random copolymers of the present invention are substantially linear and do not have a gel-like cross-linked structure can be confirmed by the fact that said copolymers perfectly dissolve in decalin kept at 135° C.

An intrinsic viscosity [η] as measured at 135° C. in decalin of the cycloolefin type random copolymer [A] which constitutes the compositions of the present invention is in the range of 0.05–10 dl/g, preferably 0.08–5 dl/g, more preferably 0.2–3.0 dl/g, and particularly preferably 0.3–2.0 dl/g.

A softening temperature (TMA) as measured with a thermal mechanical analizer of the cycloolefin type random copolymer [A] which constitutes the compositions of the present invention is not lower than 70° C., preferably in the range of 90°–250° C., more preferably 100°–200° C., particularly preferably 120°–180° C., and still particularly preferably 130°–170° C. Furthermore, a glass transition temperature (Tg) of the said cycloolefin type random copolymer [A] is usually 50°–230° C., preferably 70°–210° C., more preferably 80°–160° C., and particularly preferably 90°–150° C. A crystallinity index as measured by X-ray diffractometry of the cycloolefin type random copolymer [A] which constitutes the compositions of the present invention is preferably in the range of 0–10%, more preferably 0–7%, and most preferably 0–5%.

In the cycloolefin type random copolymer [B] which constitutes the compositions of the present invention, the repeating unit (a) derived from the ethylene component is in the range of 60–98 mol %, preferably 60–95 mol %, the repeating unit (b) derived from the cycloolefin component is in the range of 2–40 mol %, preferably 5–40 mol %, and the repeating unit (a) derived from the ethylene component and the repeating unit (b) derived from the cycloolefin component form a substantially linear cycloolefin type random copolymer in which said repeating unit (a) and said repeating unit (b) are random orientated. That the cycloolefin type random copolymers of the present invention are substantially linear and do not have a gel-like cross-linked structure can be confirmed by the fact that said copolymers perfectly dissolve in decalin kept at 135° C.

An intrinsic viscosity [$\eta$] as measured at 135° C. in decalin of the cycloolefin type random copolymer [B] which constitutes the compositions of the present invention is in the range of 0.01–5 dl/g, preferably 0.08–3 dl/g, more preferably 0.2–3.0 dl/g, and particularly preferably 0.3–2.0 dl/g.

A softening temperature (TMA) as measured with a thermal mechanical analizer of the cycloolefin type random copolymer [B] which constitutes the compositions of the present invention is below 70° C., preferably in the range of 60° to −10° C., more preferably 55° to −10° C. In this connection, the softening temperature of the cycloolefin type random copolymer [B] is suitably lower in the range of 30°–250° C., preferably 60°–200° C., more preferably 80°–190° C., and particularly preferably 90°–160° C. then that of the cycloolefin type random copolymer [A]. A glass transition temperature (Tg) of the cycloolefin type random copolymer [B] is in the range of −30 to 50° C., preferably −20° to 40° C. Furthermore, it is preferable that the glass transition temperature of the cycloolefin type random copolymer [B] is lower in the range of 30°–240° C., preferably 50°–200° C. than that of the cycloolefin type random copolymer [A].

A crystallinity index as measured by X-ray refractometry of the cycloolefin type random copolymer [B] is preferably in the range of 0–10%, more preferably 0–7%, and most preferably 0–5%.

In the compositions, the weight ratio of the cycloolefin type random copolymer [A]/cycloolefin type random copolymer [B] is in the range of 100/0.1 to 100/10, preferably 100/0.3 to 100/7, more preferably 100/0.5 to 100/5, and still particularly preferably 100/0.7 to 100/4. The present compositions are found to be insufficient in precision moldability as well as in effect of improving adhesion between the molded articles of said compositions and information recording films to be formed thereon when the weight ratio of said component [A]/component [B] is smaller than 100/0.1, and said molded articles become poor in transparency or are lowered in surface smoothness when said weight ratio is larger than 100/10, thus the compositions as information recording materials decrease in their performance.

The cycloolefin type random copolymers [A] and [B] which constitute the cycloolefin type random copolymer compositions of the present invention may both be prepared by suitably selecting the conditions under which they are prepared in accordance with the processes as proposed by the present applicant in Japanese Patent L-O-P Publns. Nos. 168708/1985, 120816/1986, 115912/1986, 115916/1986, 95905/1986, 95906/1986, 271308/1986 and 272216/1986.

In preparing the cycloolefin type random copolymer compositions of the present invention, there are applicable various known processes which include, for example, a process wherein the cycloolefin type random copolymers [A] and [B] are prepared separately, and the copolymers [A] and [B] thus prepared are blended by means of an extruder to obtain a desired composition, a solution blending process wherein the copolymers [A] and [B] are thoroughly dissolved separately in suitable solvent, for example, saturated hydrocarbons such as heptane, hexane, decane, cyclohexane, etc., or aromatic hydrocarbons such as toluene, benzene, xylene, etc., and the respective solutions are subjected to solution blending to obtain a desired composition, or a process wherein the copolymers [A] and [B] are prepared individually by means of separate polymerization reactors, and the resulting polymers are blended with a separate vessel to obtain a desired composition.

An intrinsic viscosity [$\eta$] as measured at 135° C. in decalin of the cycloolefin type random copolymer compositions of the present invention is in the range of 0.05–10 dl/g, preferably 0.08–5 dl/g, more preferably 0.2–3 dl/g, and still particularly preferably 0.3–2 dl/g, a softening temperature (TMA) as measured with a thermal mechanical analyzer of said compositions is in the range of 80°–250° C., preferably 100°–200° C., and more preferably 120°–170° C., and a glass transition temperature (Tg) of said compositions is in the range of 70°–230° C., preferably 80°–160° C., and more preferably 90°–150° C.

The cycloolefin type random copolymer compositions of the present invention contain as essential components the aforesaid cycloolefin type random copolymer [A] and cycloolefin type random copolymer [B]. In addition to the above-mentioned essential two components, however, the present compositions may be incorporated with heat stabilizers, weathering stabilizers, antistatic agents, slip agents, anti-blocking agents, anti-fogging agents, lubricants, dyes, pigments, natural oil, synthetic oil, wax, etc., and amount of these additives may be suitably decided. For instance, the stabilizers which may be optionally incorporated include concretely phenolic antioxidants such as tetrakis [methylene-3-(3,5-di-t-butyl-4-hydroxyphenyl)propionate]methane, $\beta$-(3,5-di-t-butyl-4 -hydroxyphenyl)propionic acid alkyl ester (particularly preferred are alkyl ester of less than 18 carbon atoms), 2,2'-oxamidobis[ethyl-3-(3,5-di-t-butyl-4-hydroxyphenyl)]propionate, etc., metallic salts of fatty acid such as zinc stearate, calcium stearate, calcium 12-hydroxystearate, etc., and fatty esters of polyhydric alcohol such as glycerin monostearate, glycerin monolaurate, glycerin distearate, pentaerythritol distearate, pentaerythritol tristearate, etc. These compounds may be incorporated into the present compositions either singly or in combination. For instance, there may be used such a combination of tetrakis[methylene-3-(3,5-di-t-butyl-4-hydroxyphenyl)propionate] methane with zinc stearate and glycerin monostearate, and the like combinations.

In the present invention, it is preferable to use phenolic antioxidants in combination with fatty esters of polyhydric alcohol, and said fatty esters of polyhydric alcohol are preferably those which are obtained by esterification of a part of alcoholic hydroxyl group of polyhydric alcohol having a valence of at least 3. Concrete examples of such fatty esters of polyhydric alcohol as mentioned above include fatty esters of glycerin such as glycerin monostearate, glycerin monolaurate, glycerin monomyristate, glycerin monopalmitate, glycerin distearate, glycerin dilaurate, etc. and their mixtures, and fatty esters of pentaerythritol such as pentaerythritol monostearate, pentaerythritol monolaurate, pentaerythritol distearate, pentaerythritol dilaurate, pentaerythritol tristearate, etc. and their mixtures, and fatty esters of solbitol such as solbitol monosteanted solbitol monolaurate solbitol distearate, etc and their mixture.

The phenolic antioxidants as illustrated above are used in an amount of 0.01–10 parts by weight, preferably 0.05–3 parts by weight based on 100 parts by weight of the cycloolefin type random copolymer composition. Similarly, the fatty esters of polyhydric alcohol are used in an amount of 0.01–10 parts by weight, preferably 0.05–3 parts by weight based on 100 parts by weight of the said composition.

The stabilizers which comprise a combination of the above-mentioned phenolic antioxidant and fatty ester of polyhydric alcohol, when added to the composition containing the aforementioned cycloolefin type random copolymers [A] and [B], not only can impart excellent stability to said composition but also can impart excellent stability to said copolymer [A] and also to said copolymer [B] even when said stabilizers are added individually to said copolymers [A] and [B].

In this connection, such stabilizers comprising a combination of the aforementioned phenolic antioxidant and fatty ester of polyhydric alcohol as mentioned above can also impart excellent stability to polymers, such as polymethyl methacrylate (PMMA), polycarbonate (PC) or poly-4-methylpentene-1, when said stabilizers are added thereto.

In order to prepare a thin optical disc having good appearance and a broad projection area by injection molding of a cycloolefin random copolymer [A], a cycloolefin random copolymer [B], polymethyl methacrylate, polycarbonate or poly-4-methylpentene-1, it is preferred to incorporate therein at least one stabilizer selected from:

(1) phenolic antioxidants having in the molecule a beta-(3,5-di-tert-butyl-4-hydroxyphenyl) propionyl group;

(2) normally liquid hydrocarbons having a molecular weight ranging from about 200 to 3000:

(3) phenolic antioxidants having a cycloalkyl group: and (4) esters of bis(dialkylphenyl) pentaerythritol diphosphite, Examples of the phenolic antioxidants (1) above include, for example, tetrakis [methylene(3,5-di-tert-butyl-4-hydroxyphenyl) propionate] methane, alkyl beta(3,5-di-tert-butyl-4-hydroxyphenyl) propionates (as the alkyl, those having up to 18 carbon atoms, particularly methyl are preferred) and 2,2'-oxamidobis [ethyl-3-(3,5-di-tert-butyl-4-hydroxyphenyl)propionate].

The hydrocarbons (2) above include naturally occurring and synthetized aliphatic, alicyclic aromatic and partly hydrogenated aromatic hydrocarbons, optionally substituted by alkyl, aryl and/or aralkyl groups. Examples of such hydrocarbons include, for example, dodecylbenzene, polyalkylbenzenes by-produced in the preparation of a dodecylbenzene oil, dibenzylbenzenes, alkylnaphthalenes, polyphenylalkane oil, alkylated tetralines, olefin oligomers such as ethylene-, propylene-, ethylene-propylene-and butene-oligomers, fluid paraffin, squalane and mineral oils.

The cycloalyl-containing phenolic antioxidants (3) above include a compound of the general formula:

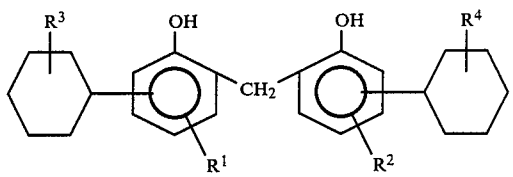

wherein $R^1$, $R^2$, $R^3$ and $R^4$ are the same or different and each represents hydrogen or alkyl. Commercially available cycloalkyl-containing antioxidants which can be used as a stabilizer include, for example, 2,2'-dihydroxy-3,3'-dicyclohexyl-5,5'-dimethyl-diphenylmethane (Vulkanox ZKF, supplied by Farbenfabriken Bayer AG),2,2'-hydroxy-3,3'-di(alpha-methylcyclohexyl)-5,5'-dimethyl-diphenylmethane (Nomox WSP, supplied by Seiko Kagaku KK), 1,1-bis(4-hydroxyphenyl) cyclohexane (Nomox WSL, supplied by Seiko Kagaku KK) and 2-(1-methylcyclohexyl)-4,6-dimethylphenol (Antigenew, supplied by Sumitomo Kagaku KK).

The stabilizers illustrated above may be used alone or in combination. The stabilizer is normally used in an amount of from 0.01 to 5 parts, preferably from 0.05 to 3 parts, and most preferably from 0.1 to 1 parts by weight per 100 parts by weight of the polymer.

Information recording base boards in accordance with the present invention are prepared by molding the cycloolefin type random copolymer compositions into desired forms in the usual way, and laminating according to a conventional method information recording films on the thus molded information recording bases.

The information recording base boards of the present invention are applicable to such information recording bases having all sorts of structures, for example, as optical disc, flexible optical disc, optical card, optical fiber, optical tape, photoconductive halo, magnetic disc and the like.

Conventionally known information recording films can be laminated on the information recording bases of the present invention. Concrete examples of useful information recording films include, for example, tellurium type alloys such as TeSe, TeSePb, Se, TeSeSb, TeGeSb and the like, films having dispersed metals in organic matrixes such as Te-carbon, gold alloys such as AuPd, AuPt and the like, terbium type alloys TbFe, TbFeCo, TbGdFe and the like, cyanine or naphthoquinone type organic color films, and magnetic materials such as ferrite and the like. As refractive materials used in such information recording films, there may be mentioned such metals as Al, Cr, Au, Co, etc. and alloys thereof. As protective or enhance films for such information recording films, there may be illustrated those which comprise $Si_3N_4$, $SiO_2$, ZnO, TiO, ZnSe, CdS, etc. In laminating such information recording films on the information recording bases of the present invention, there may be employed any conventionally known procedures, for example, such methods as vacuum deposition, spattering, ion plating, spin coating, coater coating and the like.

The cycloolefin random copolymer compositions according to the invention have applications in various fields, including, for example, optical lenses, transparent windows, flenal lenses, array lenses for laser, optical fiber connecters, recording sheets for phorography, films, plane lenses of distributed refractive indexes, (grated lenses), optical materials of reformed surface hardness (materials having dispersed therein glass or ceramics of the same refractive index), polarized light filters, filters for selection of wave length, photo sensitive films, covering and capping agents for LED and semi-conductive lasers, mirrors, prisms, beam splitters, EL bases and other optical applications, water tank of electric irons, parts of electronic ranges, base plates for liquid crystal display instruments, base plates of flexible prints, base plates for high frequency circuits, electroconductive sheets and films, film condensers, insulating painted films, materials for lightening instruments, window materials for display elements, housings of electrical instruments, protective films for lithography and other electrical applications, syringes, pipettes, animal cages, body thermometers, beakers, laboratory dishes, measuring cylinders, bottles, artificial joints, carriers for use in chromatography and other chemical and medical applications, membranes for gas separation, membranes for ultrafiltration, membranes for reverse osmosis, membranes for gas-liquid separation and other membranes for separation purpose, bodies of camera, housings of various metering instruments, films, helmets, toys and stationaries. They can also be used in applications where shape-remembering properties are required and as vibration dampers and tubes, including for example, joints for pipes of different shapes, lamination materials to be applied inside or outside of pipes or rods, optical fiber connecters, fastening pins, gypsums, vessels, automotive bumpers, various gap fillers, vibration dampers (sound insulaters) for coating metallic surfaces, medical tubes, wrapping films, protective films (for metallic plates and pipes) and heat-sealable films. They are also useful as candles, impregnating agents for matches, paper finishing agents, sizes, antioxidants for rubber, water-proofing agent for cardboards, slow releasing agents for chemical fertilizers, heat accumulators, binders for ceramics, paper condensers, electric insulating materials for electric wires and cables, agents for decelerating neutrons, fiber finishing aids, water-repellents for building materials, protecting agents for coatings, polishing agents, thixotropy imparting agents, core hardening agents for pencils and crayons, carbon ink substrates, electrophotographic toners, lubricants and releasing agents for molding of synthetic resins, resin coloring agents, hot-melt adhesives, and lubricant greases.

The cycloolefin random copolymer [A] or [B] described herein can also be used together with a suitable stabilizer in applications illustrated hereinabove.

EFFECT OF THE INVENTION

The cycloolefin type random copolymer compositions of the present invention are excellent in transparency, heat resistance, heat ageing characteristics, solvent resistance, dielectric characteristics and mechanical characteristics as well as in precision moldability, and the information recording bases molded from the present cycloolefin type random copolymer compositions are excellent in adhesion to information recording films to be laminated on said information recording bases.

EMBODIMENT OF THE INVENTION

The present invention is illustrated below in more detail with reference to examples. Various physical properties indicated in the examples were measured or evaluated according to the following procedure.

(1) Softening temperature (TMA): Using Thermo Mechanical Analyzer (manufactured and sold by Du Pont), the softening temperature was measured in terms of heat deformation behavior of a test sheet of a 1 mm thick. That is, to a quartz needle placed vertically on the test sheet was applied a load of 49 g, while elevating the temperature of the test sheet, and an elevated temperature at which the needle penetrated 0.635 mm into the test sheet was registered to take that temperature at TMA.

(2) Adhesion of information recording film: Using a thermohydrostat (PI-3G, manufactured and sold by Tabai Co.), a resin base having attached an information recording film thereto was treated for one week at 85° C. and 85% RH. Immediately after the treatment, the surface profile of the recording film and adhesion between the recording film and resin base were observed under a metallurgival microscope (magnifying power 100–400 times).

POLYMERIZATION EXAMPLE 1

Preparation of Copolymer (A) Having a Softening Temperature of at least 70° C.

With a 2-liter glass polymerization reactor equipped with a stirring blade, there was carried out continuously a copolymerization reaction between ethylene and 1,4,5,8-dimethano-1,2,3,4,4a,5,8,8a-octahydronaphthalene (structural formula:

hereinafter abbreviated to DMON). That is, into the polymerization reactor were continuously charged a cyclohexane solution of DMON so that the DMON concentration of the solution in the polymerization reactor becomes 60 g/l, a cyclohexane solution of VO(OC$_2$H$_5$)Cl$_2$ as a catalyst so that the vanadium concentration of the solution in the polymerization reactor becomes 0.9 mmol/l, and a cyclohexane solution of ethylalumium sesquichloride (Al(C$_2$H$_5$)$_{1.5}$Cl$_{1.5}$) so that the aluminum concentration of the solution in the polymerization reactor becomes 7.2 mmol/l, while continuously withdrawing from the bottom of the polymerization reactor the polymerization liquid so that the volume of the polymerization liquid in the polymerization reactor constantly becomes 1 liter. Simultaneously, into the polymerization reactor from the top of the polymerization reactor ethylene was fed at a rate of 85 l/hr, hydrogen was fed at a rate of 6 l/hr and nitrogen was fed at a rate of 45 l/hr. The copolymerization reaction was carried out at 10° C. by circulating a refrigerant through a jacket fitted externally to the polymerization reactor.

The copolymerization was carried out under the conditions as illustrated above, whereupon a polymerization reaction mixture containing an ethylene DMON random copolymer was obtained. The polymerization reaction was stopped by adding a small amount of isopropyl alcohol to the polymerization liquid to be withdrawn. Thereafter, an aqueous solution composed of 1 liter of water and 5 ml of concentrated hydrochloric acid and the polymer solution were contacted at a ratio of 1:1 with strong stirring by a homomixer to transfer the catalyst residue to the aqueous layer. The mixture was left to stand, and the water layer was removed. The residue was washed twice with distilled water to purify and separate the polymer solution. Thereafter, the polymerization liquid was poured into a household mixer containing acetone of about three times the volume of the polymerization liquid, while rotating the mixer, thereby depositing the resulting copolymer. The deposited copolymer was collected by filtration, dispersed in acetone so that the polymer concentration becomes about 50 g/l, and the copolymer was treated at the boiling point of acetone. After the treatment as above, the copolymer was collected by filtration and dried at 120° C. overnight under reduced pressure.

The thus obtained ethylene DMON-random copolymer (A) has an ethylene unit of 59 mol% as measured by $^{13}$C-NMR analysis, an intrinsic viscosity $[\eta]$ of 0.42 dl/g as measured at 135° C. in decalin, and a softening temperature (TMA) of 154° C.

POLYMERIZATION EXAMPLE 2

Preparation of Copolymer (B) Having a Softening Temperature of Below 70° C.

The same copolymerization reaction as in Polymerization Example 1 except that the cyclohexane solutions containing DMON, $VO(OC_2H_5)Cl_2$ and ethylaluminum sesquichloride, respectively, were fed into the polymerization reactor so that the concentrations of DMON, $VO(OC_2H_5)Cl_2$ and ethylaluminum sesquichloride in said solutions in the polymerization reactor become 23 g/l, 0.7 mmol/l and 5.6 mmol/l respectively and that the ethylene, hydrogen and nitrogen were fed into the polymerization reactor at rates of 140 l/hr, 13 l/hr and 25 l/hr, respectively. After the completion of the copolymerization, the resulting copolymer was deposited and collected in the same manner as in Polymerization Example 1, and then dried for 12 hours at 180° C. under reduced pressure.

The thus obtained ethylene DMON-random copolymer (B) had an ethylene unit of 89 mmol% as measured by $^{13}$C-NMR analysis, an intrinsic viscosity $[\eta]$ of 0.44 dl/g as measured at 135° C. in decalin, and a softening temperature (TMA) of 39° C.

EXPERIMENT RUN NO. 1

In 8 liters of cyclohexane were poured 400 g of the copolymer (A) and 4 g of the copolymer (B) (weight ratio: (A)/(B)=100/1), and dissolved at about 50° C. while thoroughly stirring to obtain a homogeneous solution. The thus obtained homogeneous solution was poured in 24 liters of acetone to deposit an (A)/(B) blend. The thus obtained blend was dried at 120° C. under reduced pressure overnight.

The (A)/(B) blend thus obtained was incorporated with 0.5%, 0.05% and 0.5, based on the total weight of the resins [A] and [B], of tetrakis [methylene-3-(3,5-di-t-butyl-4-hydroxyphenyl)propionate] methane, zinc stearate and glycerin monostearate, respectively, as stabilizers, and then pelletized at 23° C. with a 20 mm$\phi$ extruder (L/D=20) to prepare pellets. Thereafter, the pellets thus obtained were molded with an injection molding machine IS-50 manufactured and sold by Toshiba Machine Co., Ltd. into a disc of 1 mm in thickness and 80 mm$\phi$ (both surfaces thereof were mirror finished). The disc thus obtained was then subjected to ultrasonic cleaning with Freon TE(a product of Mitsui Du Pont Fluorochemical Co.), and then provided on the surface by the spattering method with a $Si_3N_4$/T-bFeCo/$Si_3N_4$ three-layered film as an information recording film (without pretreatment such as spattering, and the film thickness was 500 Å including a core layer). The disc obtained in this manner was allowed to stand at 85° C. and 85% RH for 170 hours in a thermohydrostat. Microscopic observation of the surface state of the recording film revealed that no change in appearance of the recording film was observed in comparison with the appearance of said film prior to the test and the adhesion of the recording film to the disc was found favorable.

EXPERIMENT RUN NO. 2

In the same manner as in Experiment Run No. 1, the copolymer (a) obtained in Polymerization Experiment Run No. 1 was incorporated with the stabilizers, pelletized, and formed into a disc which was then provided on the surface with the information recording film. Thereafter, the disc thus obtained was evaluated in the same way as in Experiment Run No. 1. As a result of microscopic observation of the recording film surface after the environmental test, it was found that there were observed a portion in the vicinity of the disc surface where foreign matters are present and the peel of the recording film at a Freon liquid sagging portion of the disc formed at the time of cleaning the disc.

EXPERIMENT RUN NO. 3

Experiment Run No. 2 was repeated except that the disc obtained was allowed to stand at 60° C., and 85% RH for 170 hours before evaluation.

EXPERIMENT RUN NO. 4

A blend was prepared by repeating Experiment Run No. 1 except that the (A)/(B) weight ratio employed was changed to 100/15. The evaluation of the information recording disc obtained was conducted in the same way as in Experiment Run No. 1. As the result, the state of the film before and after the environmental test was found favorable. However, the disc was poor in transparency and the use as an information recording disc of the thus obtained disc was found difficult.

EXPERIMENT RUNS NOS. 5–10

Information recording discs were prepared by using copolymer (A) and (B) which are synthesized using monomers as shown in Table 5 in the same manner as Polymerization Experiment Run Nos. 1 and 2 and the evaluation of the resulting information recording disc was conducted in the same way as in Experiment Run No. 1. The result is shown in Table 5.

EXPERIMENT RUNS NOS. 11–13

Information recording discs were prepared by using the 80 mm$\phi$ discs (after cleaning with Freon ET) respectively prepared in Experiment Runs Nos. 1, 6 and 8, which were individually provided as an information recording film with a $SiO_2$ single layer film (film thickness: 500 Å) on their surface in place of the $Si_3N_4$/T-bFeCo/$Si_3N_4$ three-layered film. After the same environmental test as in Experiment Run No. 1, the surface of the recording film of each disc was observed with a microscope to find that the adhesion of the film to the disc was favorable.

EXPERIMENT RUNS NOS. 14–15

On the surface of 80 mm$\phi$ discs respectively prepared in Experiment Runs Nos. 6 and 9, Al was deposited by the vacuum deposition method to form an information recording film (thickness: 100 Å). After subjecting the information recording discs to the same environmental test as in Experiment Run No. 1, the surface of the recording film of each disc was observed with a microscope. As the result, the adhesion between the deposited Al and disc was good.

Henschel mixer, and then formed at a temperature of 230° C. with a double-screw extruder having a screw of 40 mm in diameter into pellets.

Starting from the pellets thus prepared, a disc of 80 mm in diameter and 1.0 mm in thickness was molded at a temperature of 280° C. with an injection molding machine P40/25A manufactured and sold by Sumitomo

TABLE 5

| Ex. Run No. | Copolymer (A) | | | | | | Copolymer (B) | | | | | |
|---|---|---|---|---|---|---|---|---|---|---|---|---|
| | | | Composition (mole %) | | | | | | Composition (mole %) | | | |
| | Cycoolefin | Third monomer | Ethylene | Third monomer | [η] (dl/g) | TMA (°C.) | Cycoolefin | Third monomer | Ethylene | Third monomer | [η] (dl/g) | TMA (°C.) |
| 1 | ◯◯ | — | 59 | — | 0.42 | 154 | ◯◯ | — | 89 | — | 0.44 | 39 |
| 5 | " | — | " | — | " | " | " | — | " | — | " | " |
| 6 | " | — | " | — | " | " | " | — | " | — | " | " |
| 7 | " | — | " | — | " | " | ◯-CH₃ | — | 72 | — | 1.22 | 45 |
| 8 | ◯◯ | Butene | 60 | 0.9 | 0.43 | 153 | ◯◯ | — | 89 | — | 0.44 | 39 |
| 9 | " | " | " | " | " | " | " | Butene | 74 | 1.2 | 0.42 | 40 |
| 10 | ◯◯-CH₃ | — | 62 | — | 0.42 | 155 | ◯◯ | — | 89 | — | 0.44 | 39 |
| 11 | ◯◯ | — | 59 | — | " | 154 | " | — | " | — | " | " |
| 12 | " | — | " | — | " | " | " | — | " | — | " | " |
| 13 | " | Butene | 60 | 0.9 | 0.43 | 153 | " | — | " | — | " | " |
| 14 | " | — | 59 | — | 0.42 | 154 | " | — | " | — | " | " |
| 15 | " | Butene | 60 | 0.9 | 0.43 | 153 | " | Butene | 74 | 1.2 | 0.42 | 40 |
| 2 and 3 | ◯◯ | — | 59 | — | 0.42 | 154 | — | — | — | — | — | — |
| 4 | " | — | " | — | " | " | ◯◯ | — | 89 | — | 0.44 | 39 |

| Ex. Run No. | Blending ratio (A)/(B) (weight ratio) | Transparency of 80 mm φ disc | State of film after environmental test |
|---|---|---|---|
| 1 | 100/1 | Good | Good adhesion |
| 5 | 100/0.5 | " | " |
| 6 | 100/2 | " | " |
| 7 | 100/1.5 | " | " |
| 8 | 100/1 | " | " |
| 9 | 100/3 | " | " |
| 10 | 100/1.5 | " | " |
| 11 | 100/1 | " | " |
| 12 | 100/2 | " | " |
| 13 | 100/1 | " | " |
| 14 | 100/2 | " | " |
| 15 | 100/3 | " | " |
| 2 | 100/0 | Good | Peeling of recording film occurs at Freon liquid sagging portion and/or portion where foreign matters exist. |
| 3 | 100/0 | Good | Good adhesion |
| 4 | 100/15 | Bad | Good adhesion |

EXPERIMENT RUNS NOS. 16–17

An ethylene/tetracyclododecene copolymer (ethylene content: 60 mol %) having a melt flow rate (MFR: ASTM D 1238) at a load of 2.15 kg and a temperature of 260° C. was loaded with (A) tetrakis[methylene-3-(3,5-di-t-butyl-4-hydroxyphenyl)propionate]methane, (B) glycerin monostearate and (C) zinc stearate in the proportions as indicated in Table 6, mixed with a Shipbuilding & Machinery Co., Ltd. and a metal mold (a stamper for forming information pits has been set therein) for a center disc gate. The disc thus molded was evaluated on the basis of the items indicated in Table 6 (void, silver streak, flash, pit transferrability). Evaluation of these items were visually conducted, while rating of from 1 to 5 in the order of performance, beginning from the worst.

The disc thus obtained was subjected to ultrasonic cleaning with Freon ET (a product of Mitsui Du Pont Fluorochemical Co.) and then provided on the surface, as an information recording film, by the spattering method with a $Si_3N_4/TbFeCo/Si_3N_4$ three-layered film (without pretreatment such as spattering, film thickness of each layer 500 A). Under microscopic observation, the film as formed was in a good state. The disc thus obtained was allowed to stand for 48 hours at a temperature of 60° C. and a moisture of 85% in a thermohydrostat. After this environmental test, the film of the disc was observed with a microscope, whereupon no change in appearance of the tested film was observed in comparison with the appearance of said film prior to the test, and the tested film was in a good state of density.

In Table 6, amounts of stabilizers loaded were parts by weight based on 100 parts by weight of the starting resins.

EXPERIMENT RUN NO. 18

Experiment Run No. 16 was repeated except that (D) pentaerythritol distearate was used in place of the (B).

EXPERIMENT RUN NO. 19

Experiment Run No. 16 was repeated except that the (B) was not used. After the environmental test, the recording film surface was observed with a microscope, whereupon a portion in the vicinity of the disc surface where foreign matters were present, and peeling of the recording film at the Freon liquid sagging portion formed at the time of cleaning the disc, as indicated in Table 1, were found.

EXPERIMENT RUN NO. 20

Experiment Run No. 16 was repeated except that (C) N,N'-di(p-hydroxyethyl)laurylamine was used in place of the (B).

EXPERIMENT RUN NO. 21

Experiment Run No. 16 was repeated except that (F) glycerin tristearate, all the alcoholic hydroxy groups of which have been esterified, was used in place of the (B).

EXPERIMENT RUN NO. 22

Experiment Run No. 16 was repeated except that the (A) was not used.

What is claimed is:

1. A cycloolefin type random copolymer composition characterized by comprising
    (A) cycloolefin type random copolymer containing an ethylene component, and a cycloolefin component represented by the following general formula [I] or [II] and having an intrinsic viscosity $[\eta]$ of 0.05–10 dl/g as measured at 135° C., in decalin and a softening temperature (TMA) not lower than 70° C., and
    (B) a cycloolefin type random copolymer containing an ethylene component, and a cycloolefin component represented by the following general formula [I] or [II] and having an intrinsic viscosity $[\eta]$ of 0.01–5 dl/g as measured at 135° C. in decalin and a softening temperature (TMA) not lower than 70° C., the weight ratio of said (A) component/(B) component ranging from 100/0.1 to 100/10.

General formula

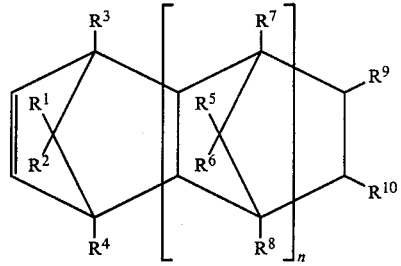

[I]

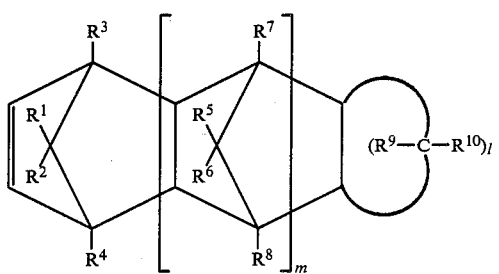

[II]

wherein n and m are each 0 or a positive integer, l is an integer of at least 3, and $R^1$ to $R^{10}$ each represent hydrogen atom, halogen atom or hydrocarbon group.

TABLE 6

| Ex. Run No. | Loadings Kind | Loadings Proportion | Void | Silver Streak | Flash | Pit transferability | Color hue (b value) | State of film after environmental test |
|---|---|---|---|---|---|---|---|---|
| 16 | A/B/C | 0.6/9.6/0.05 | 4 | 4 | 4 | 4 | 1.2 | Good adhesion |
| 17 | A/B/C | 0.6/2.0/0.05 | 4 | 4 | 5 | 4 | 1.1 | Good adhesion |
| 18 | A/D/C | 0.6/0.6/0.05 | 4 | 4 | 4 | 4 | 1.0 | Good adhesion |
| 19 | A/C | 0.6/0.05 | 3 | 3 | 2 | 3 | 3.2 | Occurrence of portion in the disc where foreign matters are present or of peeling of recording film at Freon liquid sagging portion |
| 20 | A/E/C | 0.6/0.6/0.05 | No judgement was possible due to occurrence of foaming phenomenon | | | | 10.8 | — |
| 21 | A/F/C | 0.6/0.6/0.05 | 3 | 3 | 3 | 3 | 3.0 | Occurrence of portion in disc where foreign matters are present or of peeling of recording film at Freon liquid sagging portion |
| 22 | B/C | 60/0.05 | 1 | 1 | 1 | 1 | 5.0 | Good adhesion |

2. The composition as claimed in claim 1 wherein a phenolic antioxidant and fatty ester of polyhydric alcohol are blended as stabilizers.

3. The composition as claimed in claim 2 wherein the fatty ester of polyhydric alcohol is derived from esterification of a part of alcoholic hydroxyl group of polyhydric alcohol exhibiting a valence of at least 3.

4. A cycloolefin type random copolymer composition comprising (i) a cycloolefin type random copolymer containing a ethylene component, and a cycloolefin component represented by the following general formula [I] or [II] and having an intrinsic viscosity [η] of 0.01–10 dl/g as measured at 135° C. in decalin, and (ii) a phenolic antioxidant and (iii) fatty ester of polyhydric alcohol derived from esterification of a part of the alcoholic hydroxy groups of a polyhydric alcohol exhibiting a valence of at least 3.

General formula

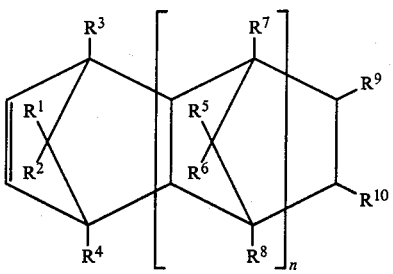

[I]

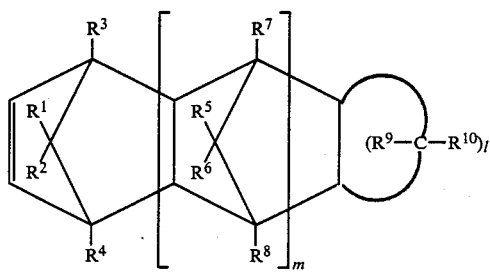

[II]

wherein n and m are each 0 or a positive integer, l is an integer of at least 3, and $R^1$ to $R^{10}$ each represent hydrogen atom, halogen atom or hydrocarbon group.

5. An information recording base board which has been molded from a cycloolefin type random copolymer composition comprising (A) cycloolefin type random copolymer containing an ethylene component, and a cycloolefin component represented by the following general formula [I] or [II] and having an intrinsic viscosity [η] of 0.05–10 dl/g as measured at 135° C. in decalin and a softening temperature (TMA) of not lower than 70° C., and (B) a cycloolefin type random copolymer containing an ethylene component, and a cycloolefin component represented by the following general formula [I] or [II] and having an intrinsic viscosity [η] of 0.01–5 dl/g as measured at 135° C. in decalin and a softening temperature (TMA) of below 70° C., the weight ratio of said (A) component/(B) component ranging from 100/0.1 to 100/10.

General formula

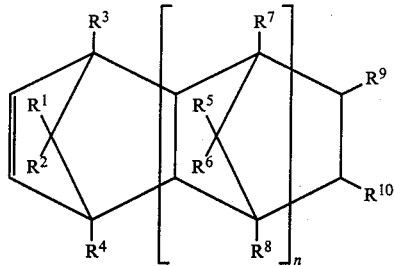

[I]

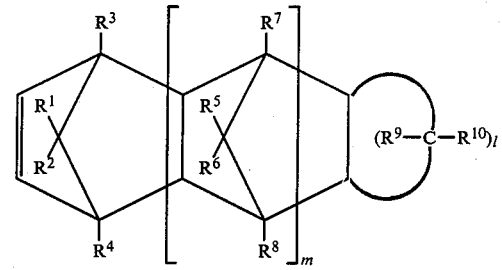

[II]

wherein n and m are each 0 or a positive integer, l is an integer of at least 3, and $R^1$ to $R^{10}$ each represent hydrogen atom, halogen atom or hydrocarbon group.

6. The information recording base board as described in claim 5 wherein a phenolic antioxidant and fatty ester of polyhydric alcohol are blended as stabilizers.

7. The information recording base board as described in claim 5 wherein the fatty ester of polyhydric alcohol is derived from esterification of a part of alcoholic hydroxyl group of polyhydric alcohol exhibiting a valence of at least 3.

8. An information recording base board which has been molded from a cycloolefin type random copolymer composition comprising (i) a cycloolefin type random copolymer containing an ethylene component, and a cycloolefin component represented by the following general formula [I] or [II] and having an intrinsic viscosity [η] of 0.01–10 dl/g as measured at 135° C. in decalin and (ii) a phenolic antioxidant and (iii) fatty ester of polyhydric alcohol derived from esterification of a part of the alcoholic hydroxy groups of a polyhydric alcohol exhibiting a valence of at least 3.

General formula

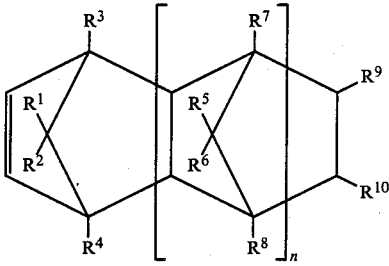

[I]

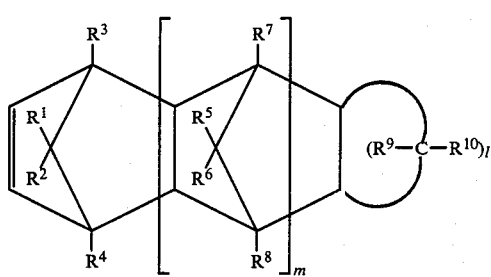

[II]

wherein n and m are each 0 or a positive integer, l is an integer of at least 3, and $R^1$ to $R^{10}$ each represent hydrogen atom, halogen atom or hydrocarbon group.

* * * * *

UNITED STATES PATENT AND TRADEMARK OFFICE
CERTIFICATE OF CORRECTION

PATENT NO. : 4,874,808
DATED : October 17, 1989
INVENTOR(S) : Syuji Minami, et al It is certified that error appears in the above-identified patent and that said Letters Patent is hereby corrected as shown below:

Claim 1, line 15, "not lower than" should read -- of below --.

Signed and Sealed this

Ninth Day of October, 1990

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,874,808
DATED : October 17, 1989
INVENTOR(S) : Minami, et al.

It is certified that error appears in the above-indentified patent and that said Letters Patent is hereby corrected as shown below:

```
On the title page, under item [76], insert the following:
[73]  Assignee:  Mitsui Petrochemical Industries, Ltd.,
                 Tokyo, Japan
```

Signed and Sealed this

Twenty-third Day of August, 1994

Attest:

BRUCE LEHMAN

*Attesting Officer*    *Commissioner of Patents and Trademarks*